July 7, 1942.   E. F. GOODHUE   2,288,620
BOLT AND WASHER ASSEMBLING MACHINE
Filed March 26, 1940   2 Sheets-Sheet 1
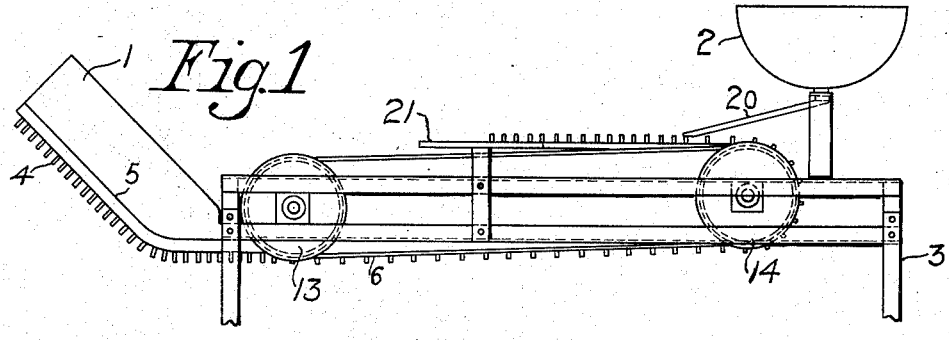
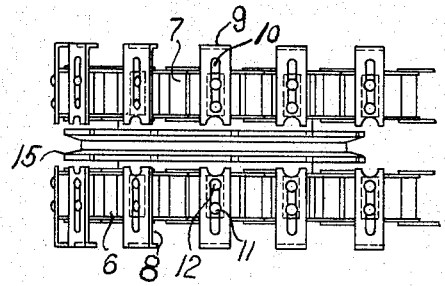
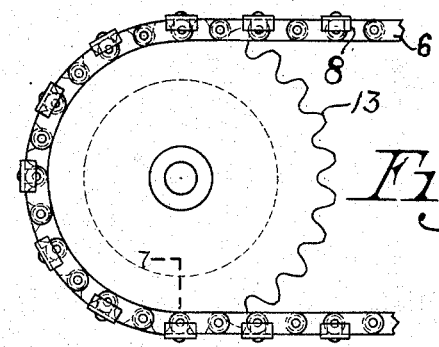
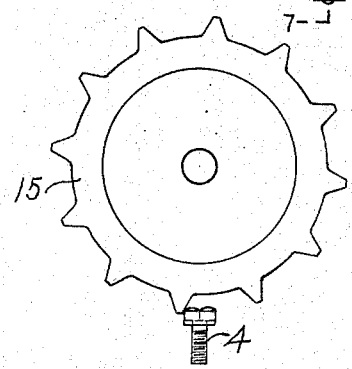
Inventor
Ernest F. Goodhue
By Samuel H. Davis.
Attorney July 7, 1942. E. F. GOODHUE 2,288,620
BOLT AND WASHER ASSEMBLING MACHINE
Filed March 26, 1940 2 Sheets-Sheet 2
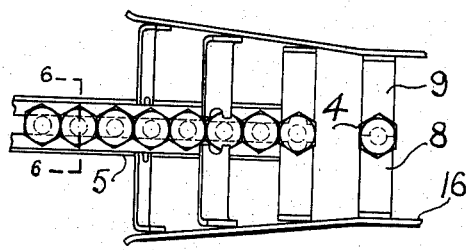
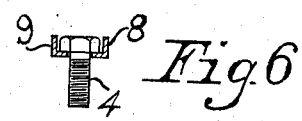
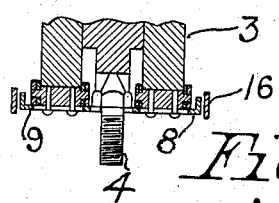
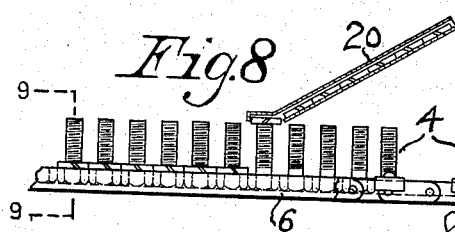
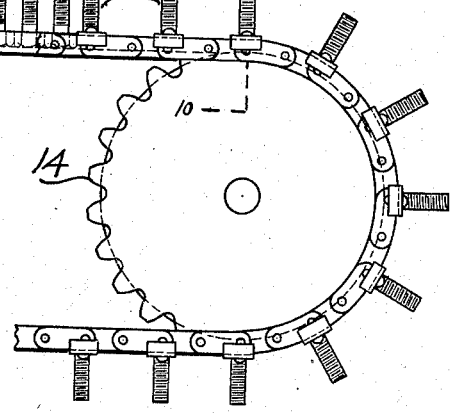
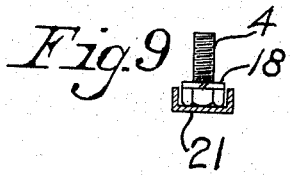
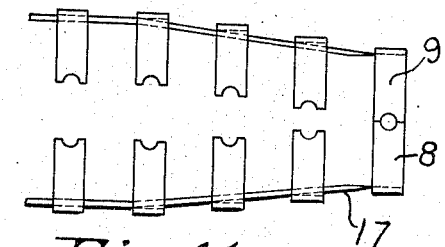
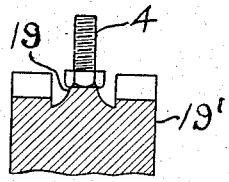
Inventor
Ernest F. Goodhue
By Samuel H. Davis
Attorney Patented July 7, 1942

2,288,620

UNITED STATES PATENT OFFICE 2,288,620

BOLT AND WASHER ASSEMBLING MACHINE

Ernest F. Goodhue, Lansing, Mich.

Application March 26, 1940, Serial No. 326,099

3 Claims. (Cl. 10—162)

This invention relates to bolt and washer assembling machines, usually termed a bolt and washer assembly, and it has for its object the construction of special parts and combinations of parts whereby it is believed the operation is rendered more effective with less consumption of driving power, and with improved certainty respecting the deposit of the washers on the stems of the bolts. The machine constructed in accordance with the invention is thought to avoid much of the wearing incident to the service of such apparatus, and to result in an extended useful life thereof.

The special construction and arrangement of the parts of this invention are illustrated in the accompanying drawings forming a part of this application and wherein Fig. 1 represents a side view of a diagrammatic character of the invention showing parts arranged for operation with the clutch elements and guides therefor omitted.

Fig. 2 is a top plan view of a portion of the link belt bolt carriers, showing the clutches thereon and illustrating the disposition and construction of the clutches.

Fig. 3 is a detached view showing one driving sprocket with one of the link belt bolt carriers thereon.

Fig. 4 is a detached view of the special bolt head engaging and serving sprocket wheel.

Fig. 5 is a fragmentary top plan view showing the bolt serving slide with the open passage lengthwise therein, and the converging clutch actuating side pieces as arranged to contact with the end flanges of the clutches and to move them towards each other.

Fig. 6 is a sectional view of the slide showing a bolt therein, the section being taken on the line 6—6 of Fig. 5.

Fig. 7 is a sectional view taken on the line 7—7 of Fig. 3 showing a bolt head engaged by the sprocket illustrated in Fig. 4 and showing also the carrier belts and clutches in section.

Fig. 8 is a fragmentary side view showing the washer serving slide or guideway, and the positions of the bolt stems to receive the washers.

Fig. 9 is a sectional view on the line 9—9 of Fig. 8 showing a bolt with head in a carrier.

Fig. 10 is a sectional view on line 10—10 of Fig. 8 showing a bolt head riding the central raised portion of a driving sprocket.

Fig. 11 represents a top plan view of the diverging side or guide pieces for separating the clutches and freeing the bolts before the washers have been placed thereon.

Throughout the drawings and description the same number is used to refer to the same part.

The bolts are placed first in a receiver 1 located at a desired distance from a hopper 2 for the washers, the receiver and hopper being ordinarily at the ends of the machine frame 3. The bolts 4 are placed in an inclined bolt serving guide 5 with stems downwardly and they pass between the lower portions of the link belt bolt carriers 6 and 7. It is intended that the carriers shall be arranged parallel and at a given distance spaced apart. They are to be driven uniformly at the same speed by any application of driving mechanism selected but not shown and forming no part of this invention. As best shown in Fig. 2, the carriers are provided with bolt clutches 8 and 9, each being made with a longitudinal slot 10 through which pass pins 11 and 12 projecting from the carriers. There are customarily two pins in the slot in order that the movement of the clutches shall be only and directly towards and from each other. Fig. 5 illustrates a form of guides for closing the clutches. Fig. 11 illustrates a form of guides for opening the clutches.

Suitable sprocket wheels 13 and 14 bear the carrier belts, and a special sprocket wheel 15, as illustrated in Fig. 4, is employed between the carriers to engage the head of bolt 4. By means of this sprocket the bolts are accurately spaced one from another between the carriers for engagement by the clutch members. It will be noted in Fig. 1 that the bolts are moved by gravity down the serving slide 5 with the stems of the bolts pointing downwardly in series and with the heads of the bolts contiguous as shown in Fig. 5. As the heads approach the special sprocket 15, the teeth of the sprocket shown in Fig. 4 enter the angular spaces between the hexagonal bolt heads and separate the bolts to the precise distance required for their engagement with the clutch members. It will be noted that each clutch member has an upturned end flange, and as best shown in Fig. 5 suitably fixed side pieces or guides 16 act exteriorly on the flanges to move the clutch members towards each other thus causing them to grasp the stems of the bolts. In Fig. 11 similar side pieces or guides are used to separate the clutch members by inwardly engaging the end flanges. This invention is not intended to be limited closely to the form, size or structural nature of the side guides 16 and 17. The converging guide sides 16 shown in Figs. 5 and 7 with the upturned end flanges of the clutch members next the insides of the sides 16 are continued parallel after the bolt stems are grasped until the bolt carrier belts 6 and 7 have turned the right hand sprocket 14 shown in Fig. 1; then the diverging guide sides 17 come into play and separate the clutches 8 and 9 releasing the bolts. As the released bolts are moved along stems up by the carrier belts and on to the receiving extension 21 they lag in movement and the bolt heads come together again as illustrated in Fig. 8. The contiguous heads are pushed along on the receiving extension 21, as in Fig. 1, and the washers descending the inclined guide trough 20, one washer next another in contact, are thus spaced with their orifices at exactly the distance apart to cause each washer to drop, loosely, on a vertical bolt stem.

The bolts 4 having been provided with a washer 18 may be carried by the operation outwardly into a receiving extension 21 of the frame and disposed of as desired.

The driving sprockets may have the form of the sprocket 19' shown in Fig. 10 with the raised middle seat 19 for the head of the bolt 4. As will best be noted from Fig. 2, the link belt elements 6 and 7 actually carry the bolts by means of the clutch members 8 and 9, and do not directly support the bolts.

In operation the bolts are moved one at a time with the stems pointing upwardly as shown in Fig. 1 and each receives a washer in its turn and is thereafter moved along in series with the others to the receiving extension of the frame described.

Having now described this invention, I claim:

1. In a bolt and washer assembling machine, bolt feeding devices comprising a pair of link belt bolt carriers spaced apart and adapted to be operated parallel and uniformly at the same speed, a bolt serving guide arranged to serve bolts between the carriers and comprising a bolt serving slide having an open passage lengthwise arranged to receive the stems of the bolts and to support the bolts with the heads thereof uppermost, a sprocket wheel arranged between the said carriers at one end of said link belts and constructed and arranged to engage the bolts and thereby move the bolts between said carriers with a predetermined space between the bolts, the said link belt bolt carriers being provided with oppositely located clutches, said clutches extending towards each other transversely on said link belt bolt carriers and movable thereon, means constructed and arranged to contact with opposite clutches and to move same towards each other whereby the stems of the bolts are clutched, and means arranged at the other end of said link belt bolt carriers and adapted to engage the said clutches and free the bolts from the clutches.

2. In a bolt and washer assembling machine, bolt feeding devices comprising a pair of link belt bolt carriers adapted to be operated parallel and uniformly at the same speed, a bolt serving guide arranged to serve bolts between the carriers and comprising a bolt serving slide having an open passage longitudinally arranged to receive the stems of the bolts and to support the bolts with their heads uppermost, a sprocket wheel arranged between said carriers at one end of said link belt bolt carriers and constructed and arranged to engage the bolts and thereby move the bolts between said carriers with a predetermined space between the bolts, the said link belts being provided with opposite clutches, said clutches extending towards each other transversely on said link belts and movable thereon, said clutches having upturned outer end flanges, converging side guides arranged to contact with the flanges of opposite clutches thereby moving opposite clutches towards each other whereby the bolts are held in the clutches, and oppositely convergent side guides located at the other end of said link belt carriers and adapted to engage the said flanges of the clutches and free the bolts.

3. In a bolt and washer assembling machine, bolt feeding devices comprising parallel movable link belt bolt carriers provided with movable bolt clutches thereon extending towards each other, each of said clutches having slots extending lengthwise and the said carriers having pins engaging the slots of the clutches whereby the clutches are movable towards and from each other, said clutches having up-turned outer end flanges, converging side guides arranged to contact with the flanges of opposite clutches thereby moving opposite clutches towards each other to clutch the bolts, said side guides being arranged at the end of said carriers whereto the bolts are served, and oppositely convergent side guides located at the other end of said link belt bolt carriers and adapted to engage the said flanges of the clutches whereby the bolts are released from the clutches.

ERNEST F. GOODHUE.